(12) United States Patent
Takasuka et al.

(10) Patent No.: US 7,414,949 B2
(45) Date of Patent: Aug. 19, 2008

(54) SEMICONDUCTOR LASER DEVICE AND OPTICAL PICKUP DEVICE

(75) Inventors: Shouichi Takasuka, Hyogo (JP); Toshihiro Kuroda, Osaka (JP); Makoto Atoji, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 644 days.

(21) Appl. No.: 11/188,650

(22) Filed: Jul. 26, 2005

(65) Prior Publication Data

US 2006/0023605 A1 Feb. 2, 2006

(30) Foreign Application Priority Data

Jul. 29, 2004 (JP) .............................. 2004-221356

(51) Int. Cl.
*G11B 7/00* (2006.01)

(52) U.S. Cl. .............................. 369/112.01; 369/112.05; 369/121

(58) Field of Classification Search ........................ None
See application file for complete search history.

(56) References Cited

U.S. PATENT DOCUMENTS

| 5,663,944 A | 9/1997 | Mun |
| 5,732,101 A * | 3/1998 | Shin ............................ 372/92 |
| 5,793,790 A * | 8/1998 | Doi et al. .................... 372/50.1 |
| 2004/0022141 A1 | 2/2004 | Nakamura et al. |
| 2004/0246874 A1 * | 12/2004 | Takagi et al. ........... 369/112.15 |

FOREIGN PATENT DOCUMENTS

| EP | 0 729 143 A2 | 8/1996 |
| JP | 61-24031 A | 2/1986 |
| JP | 6-3649 | 1/1994 |
| JP | 6-333251 A | 12/1994 |
| JP | 3108976 B | 9/2000 |

OTHER PUBLICATIONS

Extended European Search Report issued in corresponding European Patent Application No. EP 05 01 6454, dated Oct. 5, 2006.

* cited by examiner

*Primary Examiner*—Paul Huber
(74) *Attorney, Agent, or Firm*—McDermott Will & Emery LLP

(57) ABSTRACT

A semiconductor laser device includes: a semiconductor laser chip which is composed of a semiconductor substrate and a plurality of semiconductor layers stacked on an element formation face of the semiconductor substrate and which outputs an irradiation light for irradiating an optical disk; and a light receiving element which receives the irradiation light reflected by the optical disk as a feedback light. The semiconductor laser chip includes on one face thereof an electrode facing an optical element and is fixed in a package so that at least one of sub-beams reflected by the optical disk is incident on the one face. A chip exposing portion for exposing a region of the one face where the sub-beam is incident is formed in the electrode.

16 Claims, 8 Drawing Sheets

SEMICONDUCTOR LASER DEVICE AND OPTICAL PICKUP DEVICE

CROSS REFERENCE TO RELATED APPLICATIONS

This Non-provisional application claims priority under 35 U.S.C. § 119(a) on patent application Ser. No. 2004-221356 filed in Japan on Jul. 29, 2004, the entire contents of which are hereby incorporated by reference.

BACKGROUND ART

The present invention relates to a semiconductor laser device and an optical pickup which are basic components of a replaying/recording device for optical disks.

Recently, as means for reprlaying, recording, storing, and transferring various kinds of information in the form of documents, music, images, and the like, optical disks such as compact disks (CD), digital versatile disks (DVD), and the like, and optical disk devices for replaying and recording the optical disks are widely used.

Optical pickups, which are basic components that actually perform replay and recording of information, are demanded to be low in cost and to be thinner in association with recent expansion of optical disk markets and a widespread demand of portability of notebook personal computers, car navigation systems, portable mini disks, and the like. Further, on the market background that a demand for a single product capable of coping with a plurality of formats such as a CD, a DVD, and the like is increasing, an optical pickup having a function of coping with a plurality of media are earnestly desired in recent years.

For satisfying the above demands, semiconductor laser devices in which a semiconductor laser chip, light receiving elements, and various optical components, which are constitutional member of the optical pickups, are integrated and optical pickups using them have been proposed, and some of them have been used and produced in practice (see Japanese Patent Publication No. 3108976B, for example).

In the case where a semiconductor laser chip and light receiving elements are integrated, after a laser light emitted from the semiconductor laser chip is reflected by the surface of an optical disk device, the reflected light as a feedback light should be incident in the light receiving elements arranged around the semiconductor laser chip. For this reason, the feedback light is diffracted using a diffraction grating so as to be lead to the light receiving elements.

However, part of the feedback light is not diffracted by the diffraction grating and transmits directly to be incident on the surface of the semiconductor laser chip. An electrode made of a material having high reflectance such as gold is formed on the surface of the semiconductor laser chip, and therefore, the light incident in the semiconductor laser device is reflected by the electrode and heads towards the optical disk again.

In this way, when the light reflected by the surface of the semiconductor laser chip and returning to the disk again is induced, it interferes with the original emitted light. In consequence, a tracing error signal is offset by a tangential skew of the disk (see, for example, Japanese Patent Application Laid Open Publication No. 61-024031A corresponding to Japanese Patent No. 1886907B).

Under the circumstances, a wire for supplying a current to the semiconductor laser chip is bonded to the surface of the semiconductor laser chip in the feedback light incident region for scattering the feedback light so that the light reflected by the surface of the semiconductor laser chip is prevented from heading towards the disk again.

However, in the conventional techniques, a scattered light scattered at the part where the wire is bonded is incident in the light receiving elements as a stray light. This lowers especially the S/N ratio of output signals from the light receiving elements arranged in the vicinity of the semiconductor laser chip.

Further, because the different amounts of stray lights are incident in the light receiving elements, a focus error signal and a tracking error signal, which are detected by computing the output signals from the light receiving elements, are offset, generating an error in servo operation.

Moreover, in the actual mass production, positional displacement of a semiconductor laser chip mounted on a semiconductor substrate or positional displacement of a wire bonded on the upper face of the semiconductor laser chip causes displacement between the position where the feedback light is incident finally on the upper face of the semiconductor laser chip and the position where the wire bonding is performed, so that no stable scattering of the feedback light incident on the upper face of the semiconductor laser chip is attained.

In order to cope with a plurality of optical disk media, it is necessary to perform wire boding at a plurality of points for scattering various kinds of feedback lights corresponding to various beams having oscillation wavelengths of the disks. This involves complication in manufacturing process and increases the amount of the wiring material to be used, resulting in remarkable increase in cost.

Though it has been tried to absorb the light rather than scattering, every method of this kind requires an additional special manufacturing step, lowering yields and inviting difficulty in manufacturing a semiconductor laser device at low cost.

SUMMARY OF THE INVENTION

The present invention has its object of solving the above conventional problems and realizing a low-cost semiconductor laser device that can perform stable servo operation by absorbing a feedback light that is incident on the upper surface of a semiconductor laser chip without inviting a complicated manufacturing step.

To attain the above object, a semiconductor laser device includes a semiconductor laser chip with a chip exposing portion formed in the upper surface portion thereof.

Specifically, a semiconductor laser device of the present invention includes: a semiconductor laser chip composed of a semiconductor substrate and a plurality of semiconductor layers stacked on an element formation face of the semiconductor substrate for outputting an irradiation light for irradiating an optical disk; a light receiving element which receives the irradiation light reflected by the optical disk as a feedback light; a package which accommodates the semiconductor laser chip and the light receiving element and which has an optical element through which the irradiation light and the feedback light transmit; and optical divider provided on one face of faces of the optical element for dividing the irradiation light into a main beam and two or more sub-beams, wherein the semiconductor laser chip includes an electrode formed on one face of the semiconductor laser chip and facing the optical element, the semiconductor laser chip being fixed in the package so that at least one of the sub-beams reflected by the optical disk is incident on the one face, and a chip exposing portion that exposes a region of the one face where the sub-beam is incident is formed in the electrode.

In the semiconductor laser device of the present invention, the sub-beams are not reflected towards the optical disk. Therefore, the sub-beams reflected by the semiconductor laser chip do not interfere with the original sub-beam, realizing a semiconductor laser device that can perform stable serve operation. No scattered light is caused, preventing lowering in sensitivity which is caused due to the presence of a stray light.

In the semiconductor laser device of the present invention, the semiconductor laser chip preferably outputs a plurality of irradiation lights of which oscillation wavelengths are different from each other. With the above constitution, the semiconductor laser device capable of coping with a plurality of optical disk media can be realized easily.

In this case, it is preferable that the semiconductor laser chip includes: a plurality of optical waveguides; and a trench portion formed in a region between the optical waveguides in a face portion opposite the one face for isolating the waveguides electrically, and a region of the one face above the trench is covered with the electrode. With the above construction, the semiconductor laser chip increases in its strength.

In the semiconductor laser device of the present invention, it is preferable that the semiconductor laser chip includes an optical waveguide, the chip exposing portion is in a square form in plan and a direction that at least one of four sides of the chip exposing portion is in parallel with a direction that the optical waveguide extends. With the above construction, the position of the optical waveguide can be recognized accurately and position adjustment and the like can be performed without operating the semiconductor light emitting element.

In the semiconductor laser device of the present invention, the chip exposing portion is preferably in a circular form in plan. With this construction the area of the chip exposing portion is reduced to a minimum.

In the semiconductor laser device of the present invention, a pattern including information on a semiconductor laser chip manufacturing process is preferably formed in a surface portion of the electrode. In this case, it is preferable that the information on the semiconductor laser chip manufacturing process includes at least one of a production rot number and positional information on the semiconductor laser chip in a wafer. Preferably, the pattern is a barcode or a two-dimensional code.

In this case, it is preferable that the chip exposing portion is formed on an irradiation light emitting site of the electrode of the semiconductor laser chip and the pattern is formed in a region on a site opposite the irradiation light emitting site of the electrode.

In the semiconductor laser device of the present invention, it is preferable that the optical divider is a diffraction grating, the main beam is a 0-th order diffracted light of the diffraction grating, and at least two sub-beams include plus and minus first-order diffracted lights.

Preferably, the semiconductor laser device of the present invention further includes a light receiving element formation substrate on which the light receiving element is formed, wherein the semiconductor laser chip is held on an upper face of the light receiving element formation substrate in a region different from a region where the light receiving element is formed so that a face opposite the one face of the semiconductor laser chip faces the light receiving element formation substrate.

Preferably, the semiconductor laser device of the present invention further includes: a light receiving element formation substrate in which a concave portion is formed; and a reflecting mirror formed on at least one of side walls of the concave portion for reflecting a light output from the semiconductor laser chip upward farther than the light receiving element formation substrate, wherein the semiconductor laser chip is held on a bottom of the concave portion so that a face opposite the one face of the semiconductor laser chip faces the light receiving element formation substrate. With the above construction, the integrity is increased by integrating the semiconductor laser chip and the light receiving element.

In the semiconductor laser device of the present invention, the package is preferably sealed.

An optical pickup of the present invention includes: a semiconductor laser chip composed of a semiconductor substrate and a plurality of semiconductor layers stacked on an element formation face of the semiconductor substrate for outputting an irradiation light for irradiating an optical disk; a light receiving element which receives the irradiation light reflected by the optical disk as a feedback light; a package which accommodates the semiconductor laser chip and the light receiving element and which has an optical element through which the irradiation light the feedback light transmit; a first optical divider provide on one of faces of the optical element for dividing the irradiation light into a main beam and two or more sub-beams; and a second optical divider provided on another face of the optical element for guiding the feedback light to the light receiving element, wherein the semiconductor laser chip includes an electrode formed on one face of the semiconductor laser chip and facing the optical element, the semiconductor laser chip being fixed in the package so that at least one of the sub-beams reflected by the optical disk is incident on the one face, and a chip exposing portion that exposes a region of the one face where the sub-beam is incident is formed in the electrode.

In the optical pickup of the present invention, the sub-beams are not reflected toward the optical disk side. Therefore, the sub-beams reflected by the semiconductor laser chip do not interfere with the original sub-beams, realizing a semiconductor laser device that can perform stable serve operation. No scattered light is caused, preventing lowering of the sensitivity which is caused due to the presence of a stray light. Further, the integrity is increased by integrating the semiconductor laser device and the light receiving element.

The optical pickup of the present invention preferably includes light collecting means provided outside the package for collecting and guiding the irradiation light to the optical disk.

In the optical pickup of the present invention, the first optical divider and the second optical divider are preferably hologram elements formed on faces of the optical element.

DESCRIPTION OF THE PREFERRED EMBODIMENTS

Embodiment 1

Figure 1:
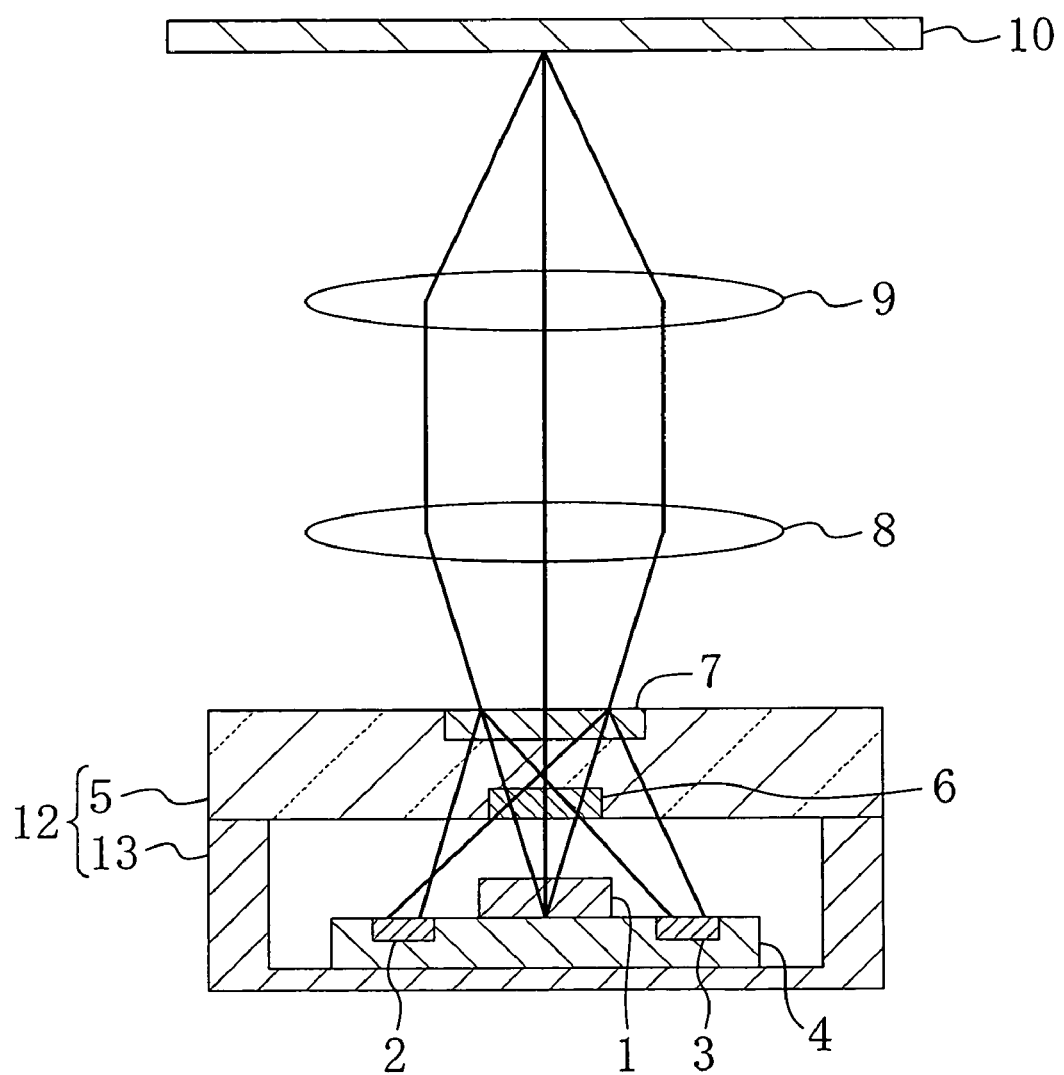
FIG. 1 is a section showing a block construction of a semiconductor laser device and an optical pickup according to Embodiment 1 of the present invention.
Figure 2:
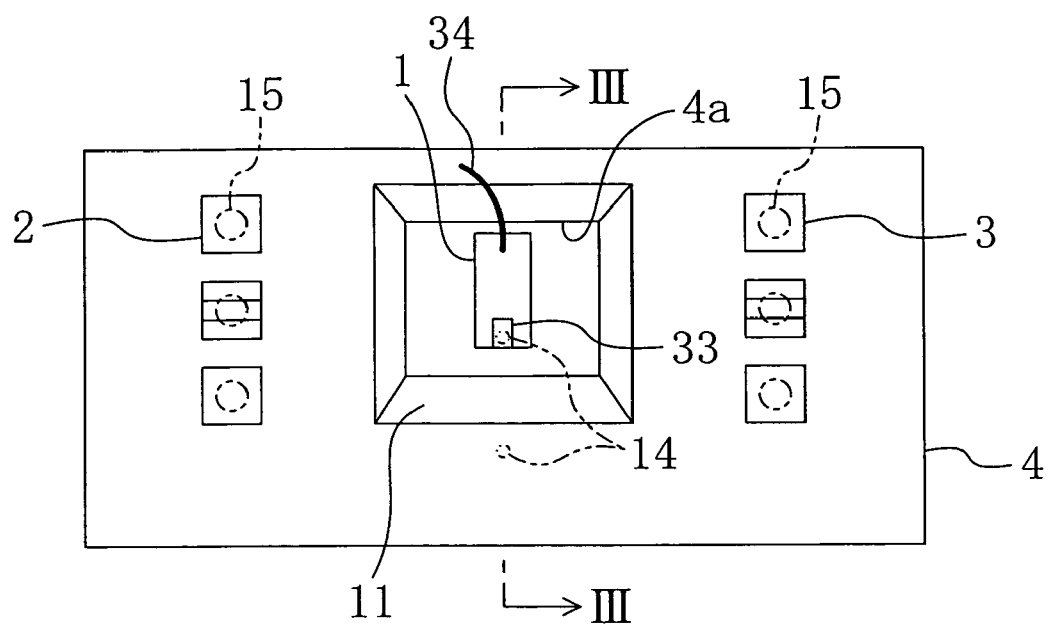
FIG. 2 is a plan view showing the semiconductor laser device according to Embodiment 1 of the present invention.
Figure 3:
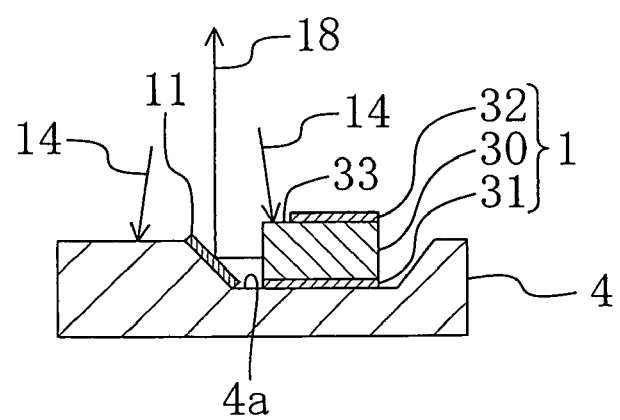
FIG. 3 is a section showing the semiconductor laser device according to Embodiment 1 of the present invention, taken along the line III-III in FIG. 2.

Embodiment 1 of the present invention will be described with reference to the drawings. FIG. 1 to FIG. 3 show the construction of an optical pickup using a semiconductor laser device according to Embodiment 1 of the present invention, wherein FIG. 1 shows a block construction of the optical pickup, and FIG. 2 and FIG. 3 show the semiconductor laser device according to the present embodiment in enlarged scales. FIG. 2 shows the construction in plan of the semiconductor laser device of the present embodiment and FIG. 3 shows the construction in section taking along the line III-III in FIG. 2.

As shown in FIG. 1 to FIG. 3, a light receiving element 2 and a light receiving element 3 are formed with a space left therebetween in a light receiving element formation substrate 4. In the region between the light receiving element 2 and the light receiving element 3 in the light receiving element formation substrate 4, a concave portion 4a is formed and a semiconductor laser chip 1 is mounted on the bottom of the concave portion 4a. On one side face of the concave portion 4a, a reflecting mirror 11 is formed for reflecting an emitted light 18 from the semiconductor laser chip 1 and taking it out upward farther than the light receiving element formation substrate 4.

The semiconductor laser chip 1 is composed of: a composite body 30 formed of a plurality of semiconductor layers including a substrate 20 and an active layer stacked on an element formation face of the substrate 20; an n-side electrode 32 formed on the upper face of the composite body 30; and a p-side electrode 31 formed on the face of the composite body 30 opposite the face where the n-side electrode 32 is formed. The semiconductor laser chip 1 is adhered to the light receiving element formation substrate 4 so that the n-side electrode 32 faces upward, and a wire 34 for power supply is bonded to the semiconductor laser chip 1.

The light receiving element formation substrate 4 is sealed inside a package 12 formed of a resin-made box 13 and an optical element 5 serving as a lid portion of the box 13.

The emitted light 18 emitted from the semiconductor laser chip 1 is reflected by the reflecting mirror 11 to head towards a disk 10. The emitted light 18 is incident to be diffracted in a diffraction grating 6 formed at the lower face of the optical element 5, and then, is separated into a main beam (0-th order diffracted light) for information reading and two sub-beams (plus and minus first-order diffracted lights) for tracking error signal detection. The thus separated emitted lights transmit through a hologram element 7 formed at the upper face of the optical element 5, so that the transmitted lights are collected on the surface of the disk 10 through a collimate lens 8 and an objective lens 9. The thus collected lights are reflected by the surface of the disk 10 to become a feedback light, transmits in the reverse direction through the objective lens 9 and the collimate lens 8, and then, is incident in the hologram element 7 again. The feedback light incident in the hologram element 7 is diffracted, and the plus and minus first-order diffracted lights of the thus diffracted feedback light are lead to and incident in beam spots 15 of the light receiving elements 2, 3. A replay signal, a focus error signal, and a tracking error signal are detected by computation based on the intensities of the lights that the light receiving element 2 and the light receiving element 3 receive.

Referring to one of the sub-beams (the plus and minus first-order diffracted lights) included in the feedback light, part thereof transmits directly through the hologram element 7 and is incident on the upper face of the semiconductor laser chip 1 as a transmitted feedback light 14. If an electrode having high reflectance is formed in the region in the upper face of the semiconductor element 1 where the transmitted feedback light 14 is incident, the transmitted feedback light 14 is reflected again towards the optical disk. This serves as a factor of interference with the original feedback light, causing a focus error and/or a tracking error.

In the semiconductor laser chip 1 of the present embodiment, however, a part of the n-side electrode 32 in the region where the transmitted feedback light 14 is incident is cut off so as to form a chip exposing portion 33 where the composite body 30 is exposed. Accordingly, the transmitted feedback light 14 is not reflected towards the optical disk 10 to thus avoid interference with the original feedback light. Further, the transmitted feedback light 14 is absorbed in the composite body 30 at the chip exposing portion 33, so that no scattered light is induced. In this connection, no stray light is generated in the light receiving element 2 and the light receiving element 3, obtaining an accurate signal.

Figure 4:
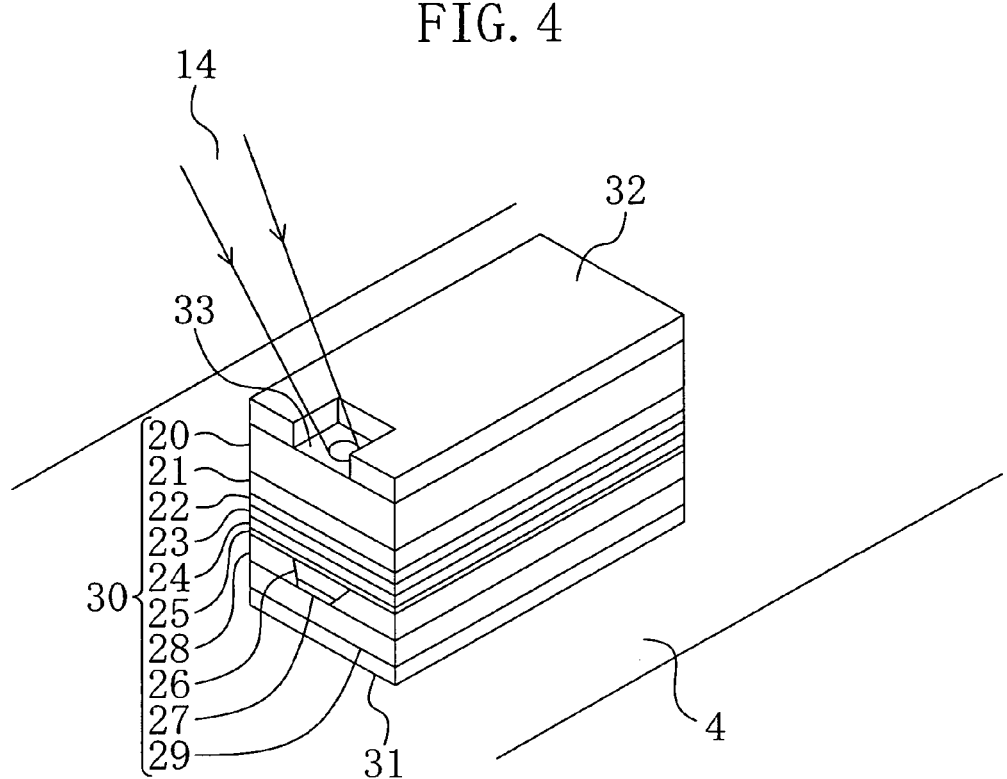
FIG. 4 is a perspective view showing a construction of a semiconductor laser chip used in the semiconductor laser device according to Embodiment 1 of the present invention.

Effects obtained by forming the chip exposing portion 33 in the semiconductor laser chip 1 will be described below. FIG. 4 is a perspective view showing the constrction of the semiconductor laser chip used in the semiconductor laser device of the present embodiment.

As shown in FIG. 4, a buffer layer 21 made of n-type GaAs, an n-type cladding layer 22 made of n-type AlGaInP, an active layer 23 having a multi-quantum well structure, a first p-type cladding layer 24 made of p-type AlGaInP, and an etch stop layer 25 made of p-type GaInP are stacked on the element formation face of the substrate 20, which is made of n-type GaAs. On the etch stop layer 25, a second p-type cladding layer 26 made of p-type AlGaInP and an intermediate layer 27 made of p-type GaInP are formed in the form of ridged strips. Further, a current blocking layer 28 made of n-type GaAs is formed on each side of the second p-type cladding layer 26 and the intermediate layer 27 in the ridged form. A contact layer 29 made of p-type GaAs is formed on the current blocking layer 28 and the ridge-shaped intermediate layer 27 on the ridged-shaped second p-type cladding layer 26. The substrate 20 and these semiconductor layers formed on the element formation face of the substrate 20 form the composite body 30.

The p-side electrode 31 is formed on the contact layer 29 while the n-side electrode 32 is formed on the reverse face of the n-type GaAs substrate 20. The n-side electrode 32 is patterned at a part thereof so as to expose a part of the reverse face of the n-type GaAs substrate 20.

It is noted that in the present embodiment, the semiconductor laser chip 1 is adhered to the light receiving element formation substrate 4 by mans of soldering so that the p-side electrode 31 is located below and the face where the n-side electrode 32 is formed faces upward when viewing the semiconductor laser chip 1 from above.

The feedback light, which has been emitted from the semiconductor laser chip 1, and has been reflected after irradiating the optical disk 10, is diffracted in the hologram element 7 so that part of the diffracted light is incident on the upper face of the semiconductor laser chip 1 as the transmitted feedback light 14. The chip exposing portion 33 is formed in the region of the surface portion of the semiconductor laser chip 1 where the transmitted feedback light 14 is incident, so that the transmitted feedback light 14 is absorbed in the GaAs substrate 20.

In the association therewith, a re-coupled current is induced by the diffracted light absorbed in the GaAs substrate 20. However, the re-coupled current, the value of which is extremely small, is damped inside the GaAs substrate 20. Therefore, no influence is brought to the operation of the semiconductor laser chip 1.

As described above, in the semiconductor laser device of the present embodiment, the transmitted feedback light 14 incident on the upper face of the semiconductor laser chip 1 is absorbed by the composite body 30 forming the semiconductor laser chip 1, resulting in no reflection of the transmitted feedback light 14 towards the disk 10. Hence, the interference of the transmitted feedback light 14 thus reflected with the original feedback light is obviated and unstable tracking serve operation caused by a tangential skew is prevented.

Further, the transmitted feedback light 14 is not scattered on the upper face of the semiconductor laser chip 1, thereby inducing no stray light that would be incident in the light receiving element 2 and the light receiving element 3. Hence, degradation in S/N ratio and offset of the detection signal are prevented.

It is noted that the chip exposing portion 33 may be formed by patterning an electrode using a widespread semiconductor process technique. This can be performed simultaneously with the formation of the electrode without any novel step added, resulting in good yield and hardly involving increase in production cost for stability enhancement of the servo operation.

Furthermore, the size and the position where the transmitted feedback light 14 is incident in the upper face of the semiconductor laser chip 1 can be computed in advance on optical design, so that the chip exposing portion 33 that absorbs the feedback light 14 surely can be formed easily.

Figure 5A:
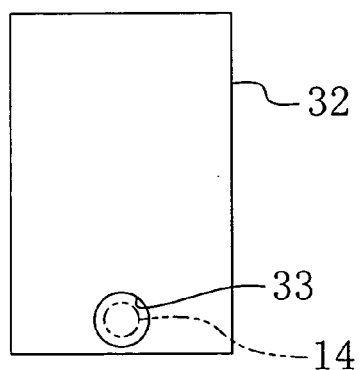
FIG. 5A and FIG. 5B are plan views each showing the construction of the semiconductor laser chip used in the semiconductor laser device according to Embodiment 1 of the present invention.

For example, it is possible to form a circular or elliptic region as the chip exposing portion 33 in the upper face of the semiconductor laser chip 1 so as to correspond to the spot of the transmitted feedback light 14, as shown in FIG. 5A. This enables maximization of the electrode area while the stable serve operation is ensured. In turn, the mechanical strength of the semiconductor laser chip 1 increases, resulting in increase in reliability at handling and the like and reducing the electric resistance to reduce power dissipation.

Figure 5B:
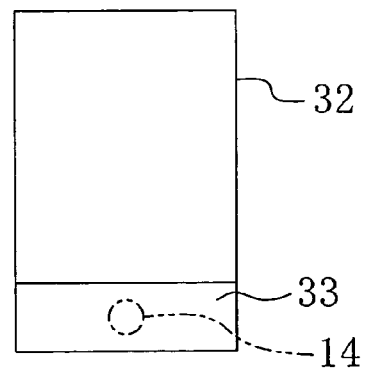

On the contrary, the chip exposing portion 33 may be formed large as shown in FIG. 5B. In this case, the chip exposing portion 33 can be formed easily.

The diffraction grating 6 and the hologram element 7, which serve as optical dividers, are provided on the upper and lower faces of the optical element 5, respectively. This enables formation of the optical pickup by integrating the optical components with the semiconductor laser device, so that the optical pickup manufacturing process, which involves higher cost than the semiconductor laser device manufacturing process is simplified, reducing the cost of the optical pickup. Further, the semiconductor laser device is sealed by the optical element 5 and the box 13 where the optical dividers and the like are formed integrally, increasing dust-proof and drip-proof characteristics to lead to fabrication of a highly reliable semiconductor laser device.

Figure 6:
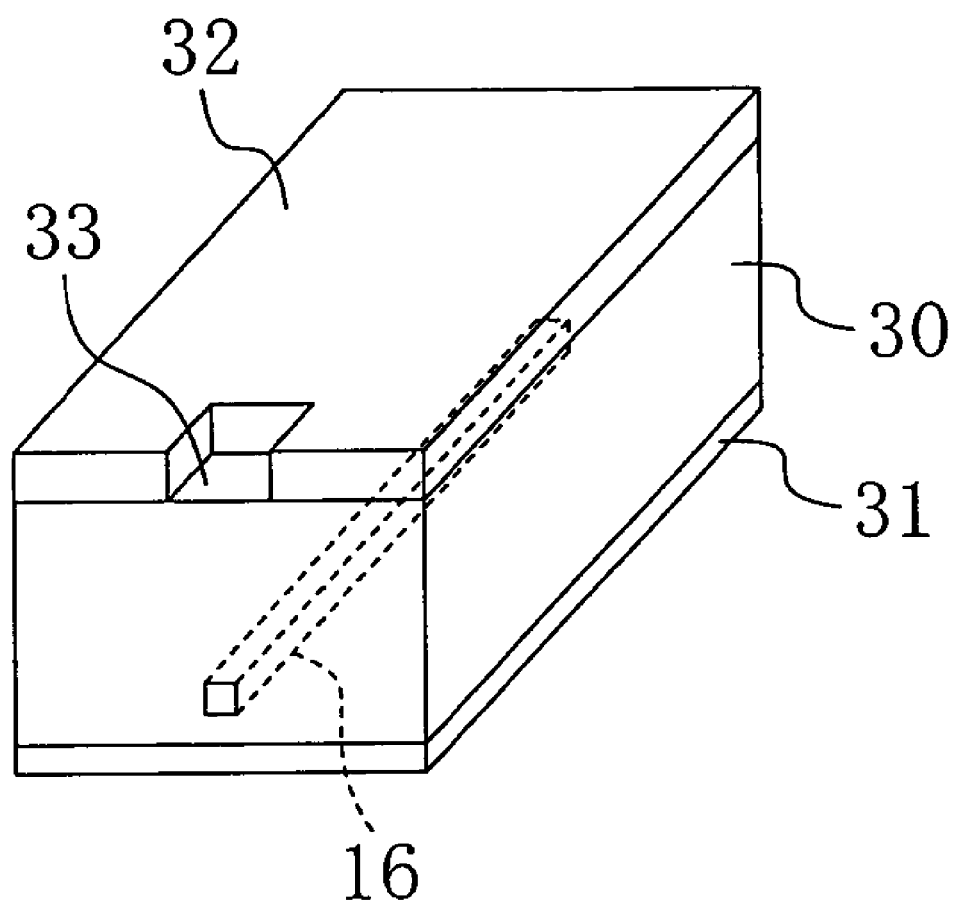
FIG. 6 is a perspective view showing the construction of the semiconductor laser chip used in the semiconductor laser device according to Embodiment 1 of the present invention.

It is noted that the chip exposing portion 33 for absorbing the transmitted feedback light 14 may have a square shape having a straight line in parallel with an optical waveguide 16 as shown in FIG. 6. In this case, the positional relationship between the optical waveguide 16 and the chip exposing portion 33 is almost determined according to the initial design values and accuracy in mask alignment (few μm or smaller) at the formation of the n-side electrode, so that the accurate position of the optical waveguide 16 formed in the semiconductor laser chip 1 can be recognized according to the position of the chip exposing portion 33.

In this connection, the semiconductor laser chip 1 can be mounted in the concave portion 4a of the semiconductor substrate 4 by referencing the position of the chip exposing portion 33 so that the optical waveguide 16 is arranged optimally on the optical design. Accordingly, the optical axis of the emitted light can be set precisely. Further, it becomes possible to measure and manage displacement of the optical axis from the proper position in a product after mounting and to adjust with high precision the position of each optical component (the optical element 5, the collimate lens 8, and the objective lens 9) arranged in the upper part of the semiconductor laser device so as to correspond to the measured position of the optical axis. This enhances the performances, the product qualities, and the yields of the semiconductor laser device and the optical pickup. In addition, the step of assembling each optical component, which has been adjusted by actually operating the semiconductor laser chip, can be changed to an adjusting scheme only by positional recognition of the optical axis of the emitted light, realizing simplification of the mass production process and cost reduction.

Modified Example of Embodiment 1

Figure 7:
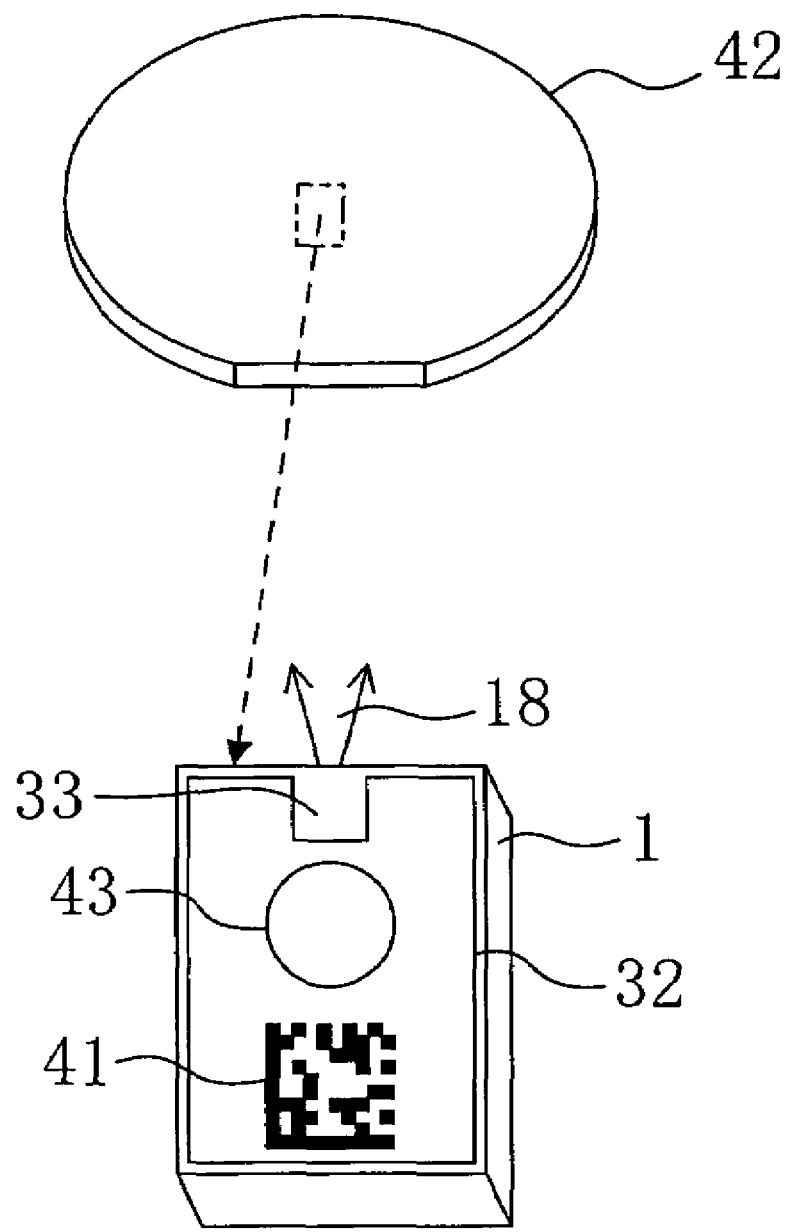
FIG. 7 is a perspective view showing a construction of a semiconductor laser chip used in a semiconductor laser device according to Modified Example 1 in Embodiment 1 of the present invention.

One modified example of Embodiment 1 of the present invention will be described below with reference to the drawings. FIG. 7 schematically shows a semiconductor laser chip used in a semiconductor laser device according to the present modified example.

In the semiconductor laser device of the present modified example, a two-dimensional code 41 is patterned in the surface portion of the n-side electrode 32 of the semiconductor laser chip 1.

In the two-dimensional code 41, information on the semiconductor laser chip manufacturing process such as a production rot number, a slice number, information on the position of the chip in a wafer 42, and the like is recorded.

In the present modified example, information on the manufacture process can be recorded in each chip, enabling accurate and easy acquisition of correlation among the chip yield, the reliability and the manufacturing process. As a result, problems in the manufacturing process can be feedbacked swiftly to increase the yield and the reliability remarkably, and in turn, to reduce the manufacturing cost remarkably.

The two-dimensional code 41 can be formed by patterning the n-side electrode 32 simultaneously with the formation of the chip exposing portion 33. Hence, the two-dimensional code 41 can be formed with less or no increase in number of the manufacturing steps.

In the case where the light receiving elements are arranged in the vicinity of the semiconductor laser chip 1, the diffraction by the hologram element 7 must be minimized. In this connection, the transmitted feedback light 14 is allowed to be incident on the light emitting site of the semiconductor laser chip 1. Therefore, it is preferable that, as in the present modified example, the chip exposing portion 33 is formed in the light emitting site of the semiconductor laser chip 1 while the two-dimensional code 41 is arranged on the opposite site thereof, and a bonding region 43 is formed therebetween.

Though the two-dimensional code 41 is used for recording the information on the manufacture process in the semiconductor laser chip 1 of the present modified example, another means such as a barcode, an originally-digitized identification number, and the like may be employed.

In addition, in the present modified example, if the p-side electrode 31 and the n-side electrode 32 are formed so as to be slightly smaller than the upper and lower faces of the composite body 30, respectively, a problem that a smooth cleavage plane cannot be formed can be solved, the problem arising at cutting out the semiconductor laser chip 1 from a wafer because of the fact that proper cleavage cannot be performed due to difference in hardness between the electrode material and the substrate.

Embodiment 2

Figure 8:
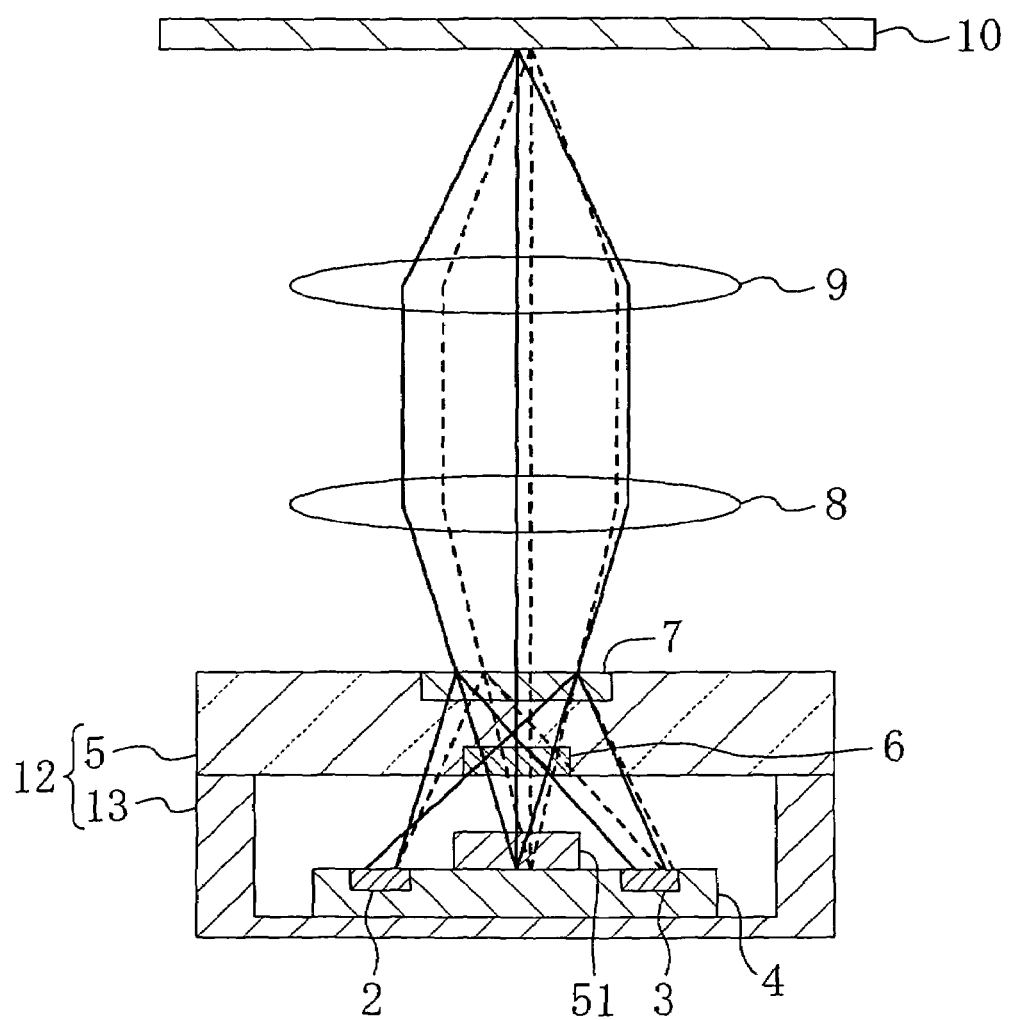
FIG. 8 is a section showing a block constitution of a semiconductor laser device and an optical pickup according to Embodiment 2 of the present invention.
Figure 9:
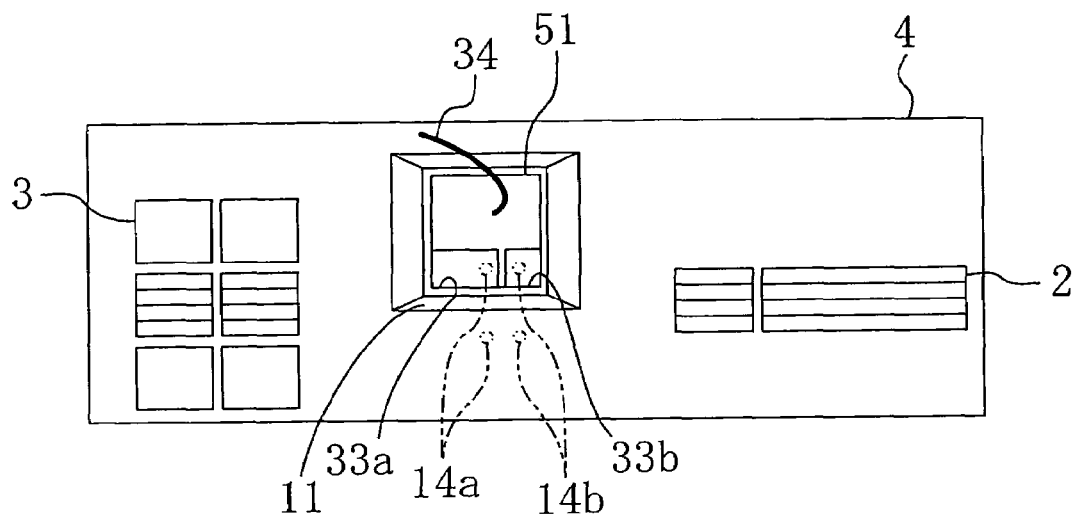
FIG. 9 is a plan view showing the semiconductor laser device according to Embodiment 2 of the present invention.

Embodiment 2 of the present invention will be described below with reference to the drawings. FIG. 8 shows a block construction of a semiconductor laser device and an optical pickup in Embodiment 2. Further, FIG. 9 is a plan view showing the construction of the semiconductor laser device in FIG. 8 in an enlarged scale. Wherein, the same reference numeral as in FIG. 1 and FIG. 2 are assigned to the same constitutional elements in FIG. 8 and FIG. 9, and the description thereof is omitted.

The semiconductor laser device of the present embodiment uses a semiconductor laser chip 51 that emits a light having an oscillation wavelength necessary for replaying a DVD disk and a light having an oscillation wavelength necessary for replaying a CD disk.

Figure 10:
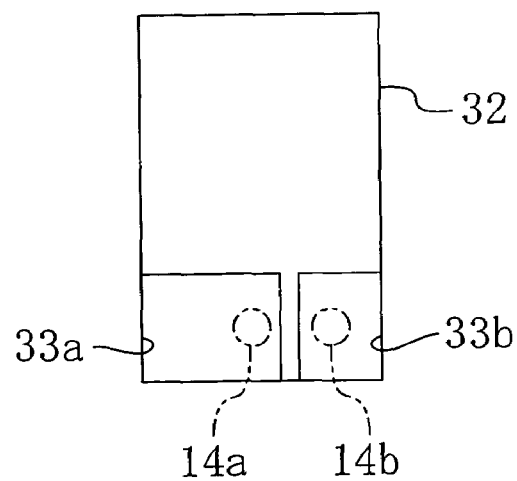
FIG. 10 is a plan view showing the construction of a semiconductor laser chip used in the semiconductor laser device according to Embodiment 2 of the present invention.
Figure 11:
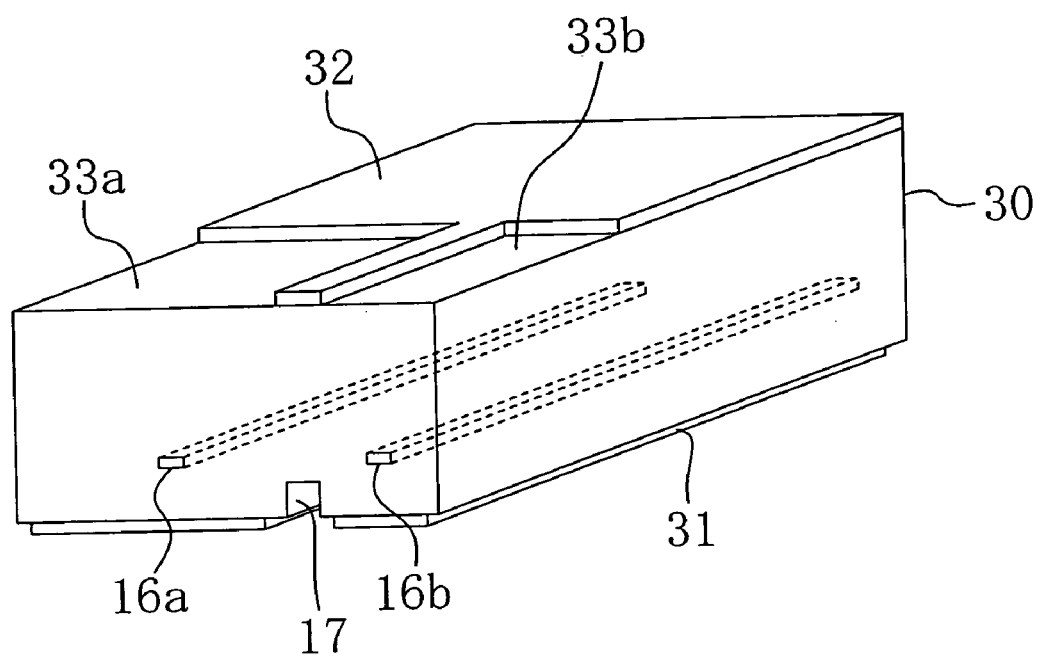
FIG. 11 is a perspective view showing the construction of the semiconductor laser chip used in the semiconductor laser device according to Embodiment 2 of the present invention.

FIG. 10 and FIG. 11 show a semiconductor laser chip 51 of the present embodiment, wherein FIG. 10 shows the construction in plan and FIG. 11 shows a stereoscopic configuration. As shown in FIG. 10 and FIG. 11, the semiconductor laser chip 51 of the present embodiment includes an optical waveguide 16a for emitting a beam having an oscillation wavelength necessary for replaying a DVD disk and an optical waveguide 16b for emitting a beam having an oscillation wavelength necessary for replaying a CD disk.

The light emitted from the optical waveguide 16a and the light emitted from the optical waveguide 16a are reflected by the surface of the optical disk 10 to become feedback lights and respective parts of the feedback lights transmit through the hologram element 7, thereby becoming a transmitted feedback light 14a and a transmitted feedback light 14b. However, due to the differences in position of the optical waveguide 16a and the optical waveguide 16b, in wavelength of the emitted lights, and the like, the transmitted feedback light 14a and the transmitted feedback light 14b are incident in different points on the upper face of the semiconductor laser chip 51. In this connection, a chip exposing portion 33a for absorbing the transmitted feedback light 14a and a chip exposing portion 33b for absorbing the transmitted feedback light 14b are formed in the upper face portion of the semiconductor laser chip 51. It is noted that a large chip exposing portion may be formed in combination of the chip exposing portion 33a and the chip exposing portion 33b.

Further, in the present embodiment, the chip exposing portion 33a and the chip exposing portion 33b are formed so as to have straight lines in parallel with a direction that the optical waveguide 16a and the optical waveguide 16b extend. The positional relationship among the optical waveguide 16a, the optical waveguide 16b, the chip exposing portion 33a, and the chip exposing portion 33b are almost determined according to the initial design values and accuracy in mask alignment (few μm or smaller) at the formation of the n-side electrode, so that accurate positions of the optical waveguides 16a, 16b formed in the semiconductor laser chip 51 can be recognized according to the chip exposing portions 33a, 33b.

In this connection, the semiconductor laser chip 51 can be mounted in the concave portion 4a of the semiconductor substrate 4 by referencing the position of the chip exposing portion 33a and the chip exposing portion 33b so that the optical waveguide 16a and the optical waveguide 16b are set optimally on the optical design. Accordingly, the optical axis of the emitted light can be arranged precisely. Further, it becomes possible to measure and manage displacement of the optical axis from the proper position in a product after mounting and to adjust with high precision the position of each optical component (the optical element 5, the collimate lens 8, and the objective lens 9) arranged in the upper part of the semiconductor laser device so as to correspond to the measured position of the optical axis. This enhances the performances, the product qualities, and the yields of the semiconductor laser device and the optical pickup. In addition, the step of assembling each optical component, which has been adjusted by actually operating the semiconductor laser chip, can be changed to an adjusting scheme only by positional recognition of the optical axis of the emitted light, realizing simplification of the mass production process and cost reduction.

Further, in the present embodiment, the electrode formed in the upper part of the semiconductor laser chip 51 is electrically connected to both the optical waveguides 16a, 16b, so that only one wire suffices for supplying an electric current thereto, attaining simplification of the wire bonding process, reduction in amount of the wire material to be used, and reduction in production cost.

Moreover, as shown in FIG. 11, in the mount face portion where the semiconductor laser chip 51 is mounted on the light receiving element formation substrate 4, an isolation trench 17 is formed for electrically isolating the optical waveguide 16a and the optical waveguide 16b. Neither the chip exposing portion 33a nor the chip exposing portion 33b is formed in the region above the isolation trench 17 in the upper part of the semiconductor laser chip 51 with the n-side electrode 32 left. Because neither the chip exposing portion 33a nor the chip exposing portion 33b is formed in the region above the isolation trench 17, which is the weakest portion in mechanical strength, the mechanical strength of the semiconductor laser chip 51 can be ensured and the handleability is increased. To the contrary, the chip exposing portion 33a and the chip exposing portion 33b are formed in the regions where the transmitted feedback light 14a and the transmitted feedback light 14b are incident, respectively, so that stable tracking servo operation can be ensured for every optical medium compatible with the laser's oscillation wavelengths.

It is noted that the two-dimensional code patterned in the surface portion of the n-side electrode, as described in the modified example of Embodiment 1, is applicable to the semiconductor laser device of the present embodiment.

It is noted also that in each embodiment, the construction of the semiconductor laser chip is not limited to the construction shown in FIG. 4 and FIG. 11. Both the p-side electrode 31 and the n-side electrode 32 may be formed on the upper face of the composite body 30.

Also, the construction is exemplified in which the semiconductor laser chip is mounted on the bottom of the concave portion formed in the substrate in which the light receiving elements are formed, but the semiconductor laser chip may be mounted on a heatsink where no concave portion is formed different from the substrate where the light receiving elements are formed.

Furthermore, the semiconductor substrate sealed by the box and the optical element is exemplified, but it is possible that a member that transmits the laser light, such as a glass, is arranged and sealed on the box and an optical element in which the hologram element and the like are formed is arranged on the member.

As described above, the semiconductor laser device and the optical pickup of the present invention exhibit effects of realizing a low-cost semiconductor laser device that can perform stable servo operation by absorbing the feedback light incident on the upper surface of the semiconductor laser chip without inviting a complicated manufacturing step, and thus, the present invention is useful for semiconductor laser devices, optical pickups, and the like which are the basic components for optical disk replaying/recording devices.

What is claimed is:

1. A semiconductor laser device, comprising:
a semiconductor laser chip composed of a semiconductor substrate and a plurality of semiconductor layers stacked on an element formation face of the semiconductor substrate for outputting an irradiation light for irradiating an optical disk;
a light receiving element which receives the irradiation light reflected by the optical disk as a feedback light;
a package which accommodates the semiconductor laser chip and the light receiving element and which has an optical element through which the irradiation light and the feedback light transmit; and
optical divider provided on one face of faces of the optical element for dividing the irradiation light into a main beam and two or more sub-beams,
wherein the semiconductor laser chip includes an electrode formed on one face of the semiconductor laser chip and facing the optical element, the semiconductor laser chip being fixed in the package so that at least one of the sub-beams reflected by the optical disk is incident on the one face, and
a chip exposing portion that exposes a region of the one face where the sub-beam is incident is formed in the electrode.

2. The semiconductor laser device of claim 1,
wherein the semiconductor laser chip outputs a plurality of irradiation lights of which oscillation wavelengths are different from each other.

3. The semiconductor laser device of claim 2,
wherein the semiconductor laser chip includes:
a plurality of optical waveguides; and
a trench portion formed in a region between the optical waveguides in a face portion opposite the one face for isolating the waveguides electrically, and a region of the one face above the trench is covered with the electrode.

4. The semiconductor laser device of claim 1,
wherein the semiconductor laser chip includes an optical waveguide,
the chip exposing portion is in a square form in plan, and
a direction that at least one of four sides of the chip exposing portion is in parallel with a direction that the optical waveguide extends.

5. The semiconductor laser device of claim 1,
wherein the chip exposing portion is in a circular form in plan.

6. The semiconductor laser device of claim 1,
wherein a pattern including information on a semiconductor laser chip manufacturing process is formed in a surface portion of the electrode.

7. The semiconductor laser device of claim 6,
wherein the information on the semiconductor laser chip manufacturing process includes at least one of a production rot number and positional information on the semiconductor laser chip in a wafer.

8. The semiconductor laser device of claim 6,
the pattern is a barcode or a two-dimensional code.

9. The semiconductor laser device of claim 6,
wherein the chip exposing portion is formed on an irradiation light emitting site of the electrode of the semiconductor laser chip, and
the pattern is formed in a region on a site opposite the irradiation light emitting site of the electrode.

10. The semiconductor laser device of claim 1,
wherein the optical divider is a diffraction grating,
the main beam is a 0-th order diffracted light of the diffraction grating, and
at least two sub-beams include plus and minus first-order diffracted lights.

11. The semiconductor laser device of claim 1, further comprising a light receiving element formation substrate on which the light receiving element is formed,
wherein the semiconductor laser chip is held on an upper face of the light receiving element formation substrate in a region different from a region where the light receiving element is formed so that a face opposite the one face of the semiconductor laser chip faces the light receiving element formation substrate.

12. The semiconductor laser device of claim 1, further comprising:
a light receiving element formation substrate in which a concave portion is formed; and
a reflecting mirror formed on at least one of side walls of the concave portion for reflecting a light output from the semiconductor laser chip upward farther than the light receiving element formation substrate,
wherein the semiconductor laser chip is held on a bottom of the concave portion so that a face opposite the one face of the semiconductor laser chip faces the light receiving element formation substrate.

13. The semiconductor laser device of claim 1,
wherein the package is sealed.

14. An optical pickup, comprising:
a semiconductor laser chip composed of a semiconductor substrate and a plurality of semiconductor layers stacked on an element formation face of the semiconductor substrate for outputting an irradiation light for irradiating an optical disk;
a light receiving element which receives the irradiation light reflected by the optical disk as a feedback light;
a package which accommodates the semiconductor laser chip and the light receiving element and which has an optical element through which the irradiation light the feedback light transmit;

a first optical divider provide on one of faces of the optical element for dividing the irradiation light into a main beam and two or more sub-beams; and a second optical divider provided on another face of the optical element for guiding the feedback light to the light receiving element, wherein the semiconductor laser chip includes an electrode formed on one face of the semiconductor laser chip and facing the optical element, the semiconductor laser chip being fixed in the package so that at least one of the sub-beams reflected by the optical disk is incident on the one face, and a chip exposing portion that exposes a region of the one face where the sub-beam is incident is formed in the electrode.

15. The optical pickup of claim 14, further comprising:
light collecting means provided outside the package for collecting and guiding the irradiation light to the optical disk.

16. The optical pickup of claim 14,
wherein the first optical divider and the second optical divider are hologram elements formed on faces of the optical element.

* * * * *